Figure 1:
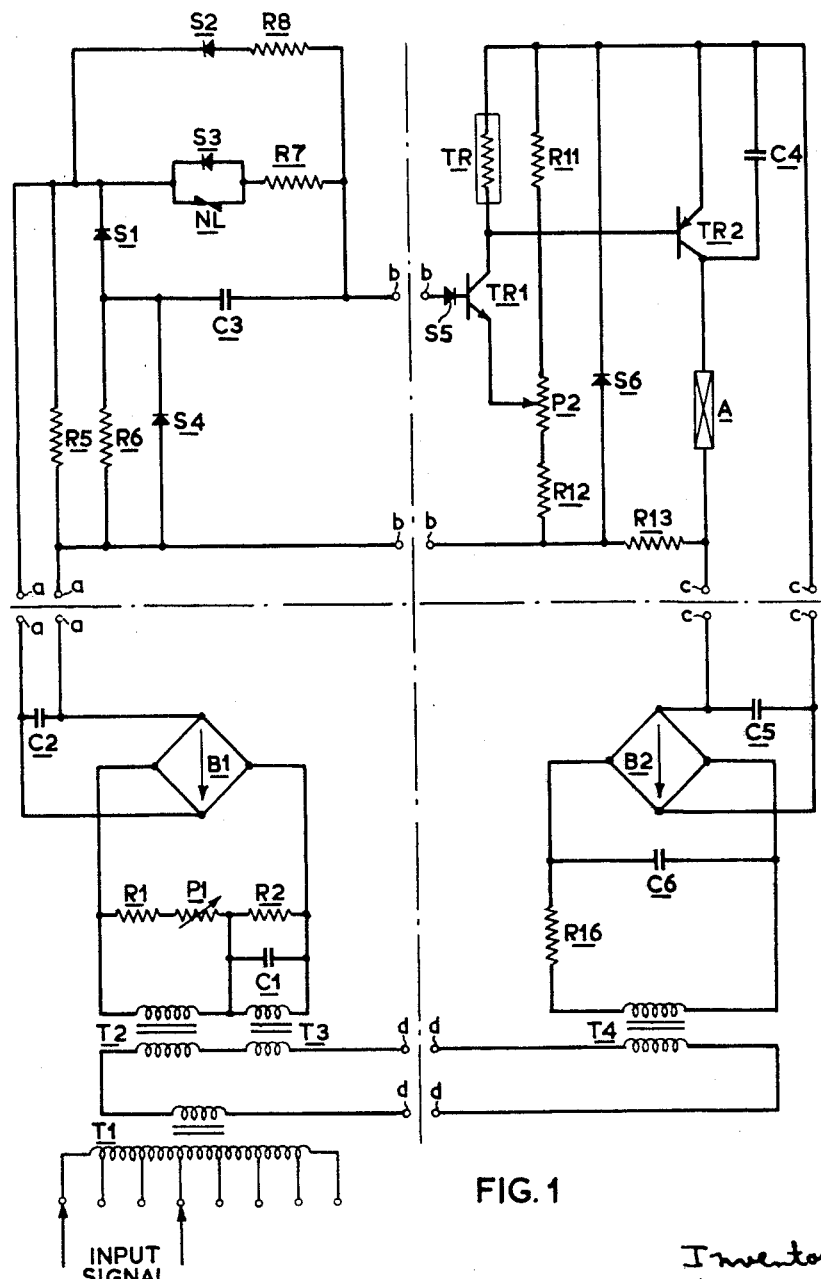

Nov. 17, 1964    E. ANTOSZEWSKI ETAL    3,157,825
ELECTRIC PROTECTIVE RELAYS
Filed June 3, 1960    2 Sheets-Sheet 1

Inventors:
Eugeniusz Antoszewski
John W. F. Sherriff
By: Stevens, Davis, Miller & Mosher
Attorneys

United States Patent Office 3,157,825
Patented Nov. 17, 1964

3,157,825
ELECTRIC PROTECTIVE RELAYS
Eugeniusz Antoszewski and John William Frederick
Sherriff, Stafford, England, assignors to The English
Electric Company Limited, London, England, a British
company
Filed June 3, 1960, Ser. No. 33,795
Claims priority, application Great Britain June 11, 1959
9 Claims. (Cl. 317—36)

This invention relates to electrical protective relays of the time-overcurrent or time-overvoltage kind.

According to the invention, for an electrical protective relay of the kind having an operating time related to the magnitude of a unidirectional overcurrent or overvoltage operating signal, timing means comprise a capacitor arranged to be charged by the operating signal through a rectifier connected in the blocking direction with respect to the polarity of said operating signal, the arrangement being such as to retard the charging of the capacitor by the operating signal.

According to a feature of the invention a non-linear bidirectionally conductive resistor having a resistance which decreases with increasing potential drop across it is connected in parallel with said rectifier whereby to supplement the non-linear action of the rectifier and modify the relay operating characteristic. A versatile relay characteristic is obtained by providing for an adjustment of the relative currents carried by this non-linear bidirectionally conductive resistor and the rectifier.

According to a further feature of the invention, said timing means are adapted to produce a potential comprising the potential across said capacitor and a potential drop across a further resistor connected to be energized through a further rectifier connected in the blocking direction with respect to the polarity of said operating signal to admit only a relatively small current when this signal has a relatively low value but to admit a relatively large current owing to the non-linear reverse-direction resistance characteristic of said further rectifier when this signal has a relatively high value, whereby to over-ride the timing action of the capacitor and promote instantaneous relay tripping operation for excessive operating signals. Preferably a zener diode is connected across the linear resistor in this latter arrangement to limit the tripping signal developed across this resistor for very large operating signals.

According to a further feature of the invention, the capacitor is connected to be charged through said first-mentioned rectifier via a linear resistor and discharged not through this linear resistor but through an additional rectifier which is more effective as a current blocking device in the reverse-current direction than the first-mentioned rectifier, whereby to provide a fast relay re-setting action.

This further rectifier may, for example, be of the silicon or germanium type. Silicon and germanium rectifiers are more effective in blocking current flow in the reverse direction than are selenium or copper oxide rectifiers.

Figure 2:
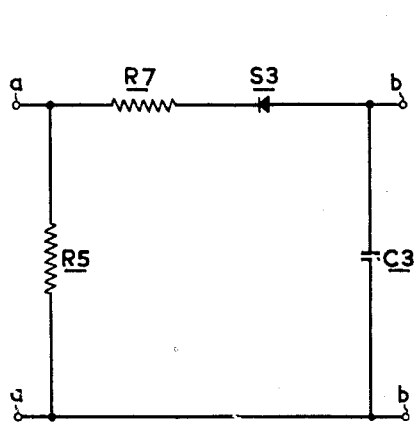
Figure 3:
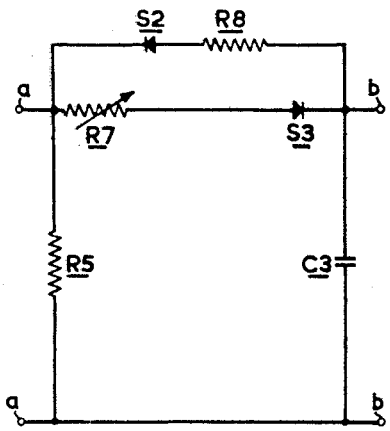
Figure 4:
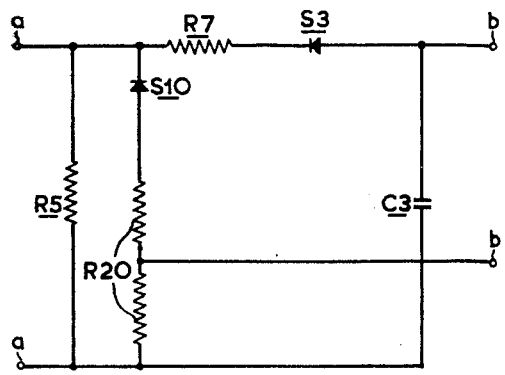

The invention and its various features will now be described with reference to FIGS. 1 to 4 of the accompanying drawings in which:

FIG. 1 shows an overcurrent protective relay having four sections comprising a timing unit, an overload detector, a measuring and tripping circuit, and a power supply unit for the components of the measuring and tripping circuit, FIG. 2 shows a timing unit which may be used as an alternative to the timing unit used in FIG. 1 to give the relay a very inverse time-overcurrent characteristic, FIG. 3 shows a timing unit which may be used to give the relay an extremely inverse time-overcurrent characteristic, and FIG. 4 shows a timing unit which may be used to reproduce a special standard form of time-overcurrent characteristic.

Referring to FIG. 1, the circuit of a time-overcurrent relay is shown to be divided for convenience and standardization into four distinct sections. In practice, these sections comprise distinct units in an assembly, one or more of which can be substituted by some similar unit to alter the characteristic of the relay. This invention consists primarily in the nature of one of these units, the timing unit. Referring to FIG. 1 the overload detector unit includes a current transformer T1 the primary winding of which may be connected to a protected circuit to be energized in accordance with a current in this protected circuit. The secondary winding of current transformer T1 is connected to energize the primary windings of three other current transformers T2, T3 and T4. However, only transformers T2 and T3 are included in the overload detector unit, the transformer T4 forming a part of the power supply unit for the measuring and tripping circuit. Transformer T3 is designed and loaded to saturate at a lower input current than transformer T2 and the secondary windings of these two transformers are operative to produce equal E.M.F.'s when the transformers are unsaturated. Thus, by connecting the secondary windings of these transformers in opposition an output E.M.F. is obtained which is zero for lower output signals from the transformer T1. This E.M.F. is applied to the rectifier B1 which supplies the output signal of the overload detector through terminals denoted $a$. This output signal is smoothed by the capacitor C2. A load for the transformers T2 and T3 is provided by the resistors R1 and R2 respectively and also, in the case of transformer T2 by a potentiometer P1 which provides an adjustable feature by which for low output signals from the transformer T1 the output signal of the overload detector unit can be adjusted to zero value. The output circuit of the transformers also includes a capacitor C1 which is effective to correct for phase angle differences between the transformers and load circuits to help in the obtaining of a good balance between the induced E.M.F.'s in the secondary windings of the two transformers. The setting of the relay is determined by the level at which the transformer T2 saturates but the relay operating range may be adjusted by altering the tappings on the primary winding of transformer T1 through which the current input signal of the overload detector unit is supplied. When this input signal exceeds the level fixed by the relay setting an out-of-balance E.M.F. is supplied by the transformers T2, T3 to the rectifier B1 and a D.C. output signal proportional to the overcurrent component of the input signal to the detector unit is provided at the terminals $a$.

The terminals of the detector unit at $a$ are connected to similar terminals in the timing unit. The function of this unit is to provide at its output terminals $b$ a signal related to the signals supplied to the unit but retarded to introduce a time delay which is specifically related to the magnitude of the input signal. The measuring and tripping circuit which is connected to receive an output signal from the terminals at $b$ operates when this output signal exceeds a predetermined level to promote the operation of an auxiliary relay A. Thus, the function of the relay circuit shown in FIG. 1 is to operate relay A in response to overload conditions of a current input signal supplied to the overload detector with a time delay related to the magnitude of this overcurrent signal, the time relationship being determined by the timing action of the timing unit.

The measuring and tripping circuit unit has a form described in our co-pending United States Patent application Serial No. 33,687, filed June 3, 1960, now Patent No. 3,117,253. It consists of two germanium-type transistors TR1, TR2 connected to form stages of a two-stage amplifier circuit. An input signal supplied at terminals $b$ is applied through a germanium diode S5 to the base emitter circuit of the transistor TR1. This transistor is of the n-p-n type, and has its emitter connected to a movable tapping on a potentiometer P2 which is connected in a series combination between two resistors R11, R12 across the H.T. supply of the first stage of the amplifier. An H.T. supply for the measuring and tripping circuit is derived from the terminals at $c$. This supply forms directly the H.T. supply for the second stage of the amplifier but in order to render the first stage more immune from fluctuations of this supply a limiting net-work comprising resistor R13 and zener diode S6 is included in the circuit as shown to provide a stabilized H.T. supply for the first stage of the amplifier. A thermistor denoted TR is connected in the collector circuit of the transistor T1 and provides the output signal of the first stage of the amplifier, supplying this as an input signal to the base emitter circuit of the transistor TR2 which is of the p-n-p type. The auxiliary relay A is connected in the collector circuit of this transistor TR2 and a capacitor C4 is connected between the collector and emitter of the transistor to protect it from high transient voltages produced by the relay A during a switch operation. In operation, the potentiometer tapping of potentiometer P2 is maintained at a stable potential by the action of the voltage limiter network formed by diode S6 and resistor R13. The potential of this tapping determines the threshold level of the connected signal at terminals $b$ which will render the transistor TR1 conductive. The current produced in the thermistor TR by this conductive state is detected and amplified by the transistor TR2 which then operates the relay A. The germanium diode S5 is operative to diminish the collector-base leakage current of the transistor TR1 which flows back through the timing circuit in the reverse direction.

The function of the thermistor is to provide a temperature compensation feature in the measuring and tripping circuit to compensate for the temperature effect on the transistors. This compensation is particularly necessary where a transistor such as the transistor TR1 is controlled by a small input current because under these conditions, where the input current is of the same order as the leakage current of the transistor, the excessive temperature sensitivity of the leakage current becomes important. It is to be noted that the circuit must operate with a low input current if the timing action of the timing unit is not to be unduly upset by a power drain on the timing capacitor in this unit.

The power supply unit consists simply of the current transformer T4 which supplies a load formed by resistor R16 and the bridge rectifier B2. Capacitors C5 and C6 are connected across the output and input of the rectifier B2 for smoothing purposes and for protection of the transistors of the measuring and tripping circuit against excessive transient effects. As shown in the drawing the power supply unit supplies the H.T. signal in the measuring and tripping circuit through the terminals at $c$.

The timing unit shown in FIG. 1 includes a capacitor C3 which is connected to be charged by an input signal supplied to the terminals at $a$ through a selenium or copper oxide rectifier S3 and a resistor R7. Also, connected in parallel with the rectifier S3 is a nonlinear resistor denoted NL. This resistor may for example be of the kind known by the trade name "Metrosil." A resistor of this material has a resistance which decreases with increasing voltage across the resistor. The rectifier S3 is connected in the reverse sense with regard to charging currents supplied by the bridge rectifier B1 in the overload detector. The rectifier therefore offers a high resistance to input signals and with a typical circuit of the kind shown in FIG. 1 an operating time, by which is meant that the time required for the charge of the capacitor C3 to rise to a level adequate to promote the operation of the relay A, of as high as one hour may be obtained with a smaller overcurrent signal.

The timing unit shown in FIG. 1 further includes provision for a fast reset feature and an instantaneous relay operating feature for adequately high overcurrent input signals. The operating characteristic of the relay depends upon the characteristic of the rectifier S3 as modified by the action of the non-linear resistor NL and as further modified by the action of the resistor R7. For relay resetting the resistor R7, if of high resistance, will introduce a time delay unless shunted by some other path. In FIG. 1 such a path is provided by the silicon or germanium rectifier S2 which is connected in series with a resistor R8. This resistor R8 can be of relatively low resistance compared with the resistance of R7 and need only be sufficiently high to limit the discharge current to a safe level. The resistor R5 is connected across the input terminals of the timing unit to provide an easy path for the discharge current under resetting conditions. To provide a near instantaneous trip feature when the overcurrent is, say, four times the minimum current required to promote relay operation an additional signal is added in series with the potential of the capacitor C3 to provide the output signal of the timing unit at the terminals $b$. This additional signal is derived from a resistor R6 which is connected in series with a selenium or copper oxide rectifier S1 and energized through this rectifier from the input terminals $a$. For relatively smaller overcurrent signals the rectifier S1 offers a high resistance compared with resistor R6 and therefore this circuit has little effect on the output signal from the timing unit. However, for high overcurrent signals the resistance of the rectifier S1 decreases so that the potential of resistor R6 becomes more important in governing relay operation and for adequately high overcurrent signals is able to produce an output signal on the terminals $b$ adequate to operate the relay A without being subject to the retarding action of the capacitor C3. To cater for extremely heavy overloads a zener diode S4 is connected across the resistor R6 to protect transistor TR1 of the measuring and tripping circuit from overloads.

An adjustment of the operating characteristic of the relay may be obtained by providing stable tappings on the rectifier S3 and the resistor R7. Also the timing unit may be varied in design to provide different relay operating characteristics and in one simple form may merely consist of the network shown in FIG. 2. When the network has the form shown in FIG. 2 a time-overcurrent relay operating characteristic substantially of the form $I^2t=$constant is obtained; in this expression I is the magnitude of the overcurrent signal and $t$ is the operating time of the relay. Such a characteristic is known in the relay art as "very inverse." On the other hand, if the timing unit has the form shown in FIG. 3 a characteristic which is extremely inverse and which may be expressed by the relationship $I^nt=$constant is obtained. The value of $n$ in this expression depends upon the adjustment of the system and may be of the order of 3 or 4. However, if the non-linear resistor is connected in circuit as shown in FIG. 1 it is possible for the value of $n$ to be as great as 8.

In the modification shown in FIG. 4 the relay characteristic has a value for which $n$ is slightly less than one and which can be adjusted to equal the standard overcurrent relay characteristic specified in British Standard No. 142.

In this unit the potential drop across a part of a shunt path is set off against the capacitor potential to provide the output signal. This shunt path comprises the selenium or copper oxide rectifier S10 connected in series with a tapped resistor R20 across the terminals $a$. The tapping on this resistor R20 constitutes one of the output connections of the unit as shown.

In operation, for low overcurrent signals the rectifier S10 has a relatively high impedance which results in the potential across the capacitor C3 being little different from that between the terminals *b*. However, for high overcurrent signals the rectifier S10 has a relatively low impedance and the resistor R20 is therefore more effective in producing a difference of potential between the lower terminal *b* and the corresponding end connection of the capacitor C3. As a result of this, with increasing overcurrent signal, the output signal from the terminals *b* becomes progressively smaller than the capacitor potential and so tends to render the operating time-overcurrent characteristic of the relay less inverse.

What we claim as our invention and desire to secure by Letters Patent is:

1. An electric circuit for giving a unidirectional output signal exceeding a first predetermined value in response to a unidirectional input signal exceeding a second predetermined value after a time delay dependent on the value of said input signal, said circuit comprising a pair of output terminals, a capacitor connected thereacross, at least one input terminal and connecting means between a said input terminal and one side of said capacitor, said connecting means including a first rectifier connected in the blocking direction with respect to the polarity of said input signal and second means including a second rectifier connected in the blocking direction with respect to the polarity of said input signal and a resistor connected to be energized by said input signal through said second rectifier, said second means being connected so that said output signal comprises the potential drop across said capacitor and a potential drop across said resistor, so that, when said input signal has a relatively small value, said resistor carries only a relatively small current and, when said input signal has a relatively large value, said resistor carries a relatively large current owing to the non-linear reverse-direction resistance characteristic of said second rectifier.

2. An electric circuit according to claim 1, including a bidirectionally conductive resistor connected in parallel with said first rectifier, said resistor having a resistance which decreases with increasing potential drop thereacross.

3. An electric circuit according to claim 2, including means for adjusting the relative currents carried by said bidirectionally conductive resistor and said first rectifier.

4. An electric circuit according to claim 3, wherein said adjusting means comprise tappings on said first rectifier.

5. An electric circuit according to claim 1, wherein said second rectifier is a copper oxide rectifier.

6. An electric circuit according to claim 1, wherein said second rectifier is a selenium rectifier.

7. An electric circuit according to claim 1, including a third rectifier connected across said first rectifier in the blocking direction with respect to the polarity of said input signal and being more effective as a current-blocking device in the reverse-current direction than said first rectifier, thereby having only a small effect on said time delay but providing a path for the rapid discharge of said capacitor.

8. An electrical protective relay of the kind having an operating time related to the magnitude of a unidirectional overcurrent or overvoltage operating signal and comprising an electric circuit according to claim 1 defining timing means therefor, and relay tripping means responsive to the output signal from said timing means.

9. An electrical protective relay according to claim 8, including overload detecting means comprising two input current transformers having their secondary windings connected mutually in opposition, said transformers having such relatively different saturation characteristics that their combined output E.M.F.'s are zero under normal circuit conditions in a system to be protected by said relay and a differential E.M.F. is produced by them under abnormal circuit conditions, and a reactance connected across a said secondary winding to correct for phase angle difference between said transformers.

References Cited in the file of this patent

UNITED STATES PATENTS

| | | |
|---|---|---|
| 2,403,372 | Jackson | July 2, 1946 |
| 2,875,382 | Sandin | Feb. 24, 1959 |
| 2,920,242 | Koss | Jan. 5, 1960 |
| 2,922,109 | Hodges et al. | Jan. 19, 1960 |